United States Patent [19]

Taylor

[11] 4,021,934
[45] May 10, 1977

[54] WINDSURFING TRAINING DEVICE

[76] Inventor: Glenn R. Taylor, 940 Cotton St., Menlo Park, Calif. 94025

[22] Filed: Jan. 28, 1976

[21] Appl. No.: 653,090

[52] U.S. Cl. .................................................. 35/11
[51] Int. Cl.² ............................................ G09B 9/06
[58] Field of Search ............... 35/11 A, 12 K, 12 P; 272/32, 130

[56] References Cited

UNITED STATES PATENTS 2,855,702 10/1958 Taylor ................................. 35/11 A
3,940,862 3/1976 Nishimura ......................... 35/11 A Primary Examiner—William H. Grieb
Attorney, Agent, or Firm—Julian Caplan

[57] ABSTRACT

The device trains a user of a windsurfer board, which comprises a mill (resembling a surfboard) having a central longitudinal daggerboard (similar to a keel) and a short skeg at the stern and has a mast pivoted to the board forward of the keel carrying a sail, the tack of the sail being attached to a curved boom extending from the mast. In water, the hull pivots around the daggerboard and the skeg functions as a drag on the pivoting. The training device simulates this effect on land. The hull (with daggerboard removed) is fastened to a table supported by a vertical shaft journalled in a base supported above the ground. The shaft has a radial crank connected to two shock absorbers which are also supported by the base. The shock absorbers simulate the friction of the hull and the drag of the skeg in water.

9 Claims, 4 Drawing Figures

WINDSURFING TRAINING DEVICE

This invention relates to a new and improved windsurf board training device. Windsurf boards are becoming increasingly popular since they combine aspects of surfing and sailing. Since more than one person cannot ordinarily occupy a board in the water, training in the basic skills for the use of the board is difficult. The present invention provides means for training users when surfboards are on land, and hence makes the training effective preliminary to actual use of the board in the water.

A feature of the invention is that the training device simulates quite accurately the action of the hull in the water under the influence of the wind. Thus the effect of the wind on the action of the hull and the actions of the user in accommodating these forces is an important part in the training of use of the device. The present invention is of great use in practice in the movements required to accommodate wind conditions.

Another feature of the invention is the fact that the drag on turning of the hull is resisted by hydraulic shock absorbers of the type used on automobiles. These provide a drag to turning movement of the hull. Means is provided to adjust this drag so as to simulate different conditions.

Other features of the invention are the inexpensive construction, the simplicity of manufacture and use and the ready portability of the training device. In addition, the device may be adapted to use with a variety of different windsurf boards.

Other objects of the present invention will become apparent upon reading the following specification and referring to the accompanying drawings in which similar characters of reference represent corresponding parts in each of the several views.

Figure 1:
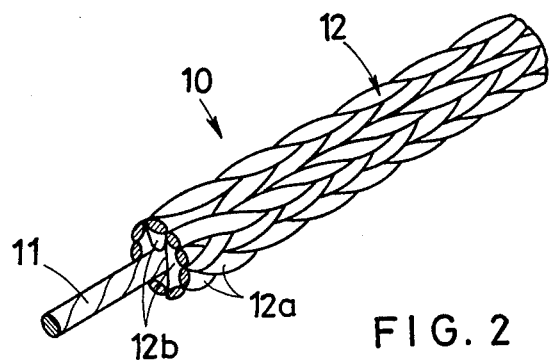
FIG. 1 is a schematic elevational view of a windsurf board mounted on the device.

Windsurf board 10 shown in FIG. 1 is only schematically shown since this is a commercially available and patented device. Essentially, it consists of a hull 11 which is similar in shape to a surfboard. The hull is formed with a vertical opening 12 in which fits a daggerboard (not shown) when the device 10 is used in the water. The daggerboard functions as a keel in a sailboat. A mast 16 which is connected to the hull 11 by a swivel connection (not shown) extends above hull 11 and mounts a sail 17 of generally triangular shape. A pair of booms 18 extend from mast 16 partway up its total height and are curved around and meet together at a point where the booms are attached to the outer corner of the sail to hold the sail unfurled.

Figure 2:
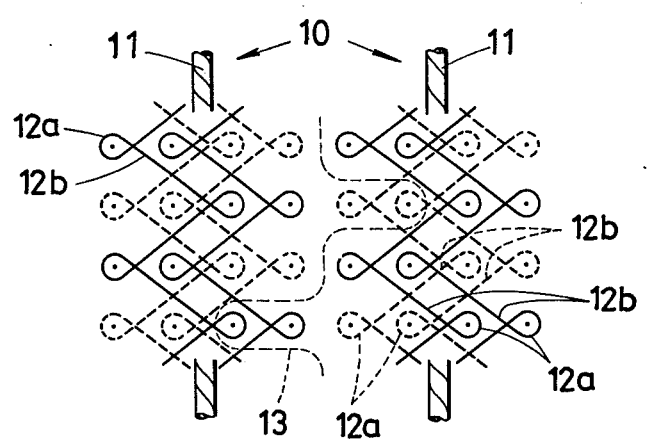
FIG. 2 is an enlarged sectional view taken along the line 2—2 of FIG. 3.
Figure 3:
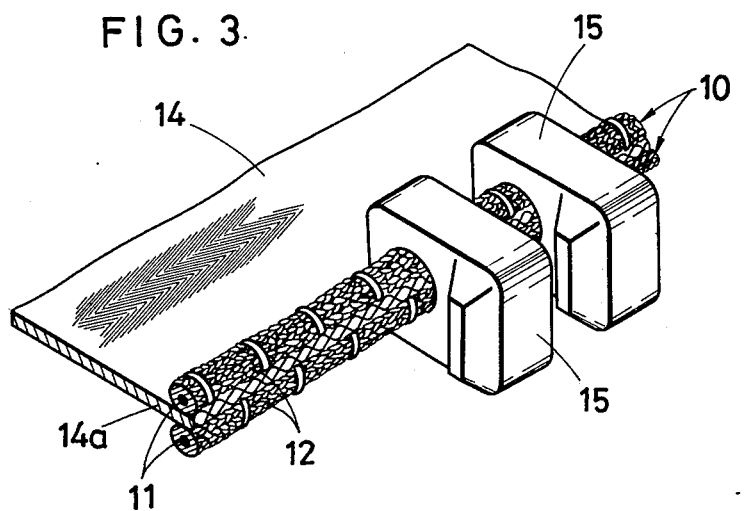
FIG. 3 is an enlarged side elevational view showing a board mounted on the training device, the board being shown in dot-and-dash lines.
Figure 4:
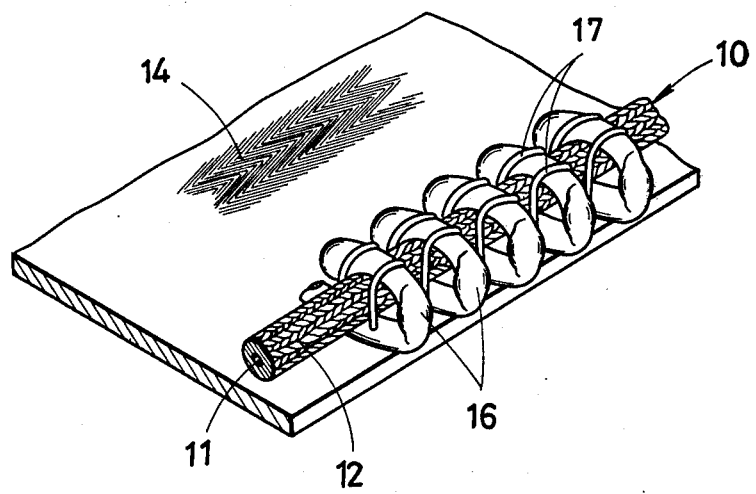
FIG. 4 is a fragmentary further enlarged view taken along the line 4—4 of FIG. 3, showing attachment of the shock absorbers.
Figure 2:
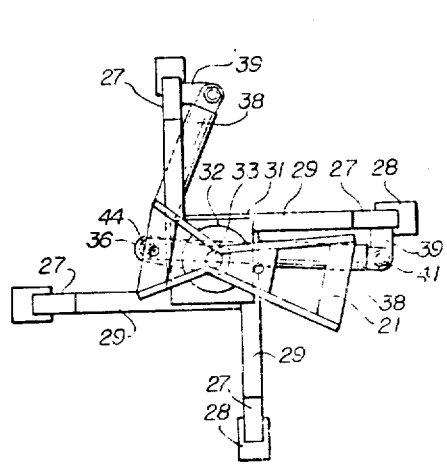
Figure 1:
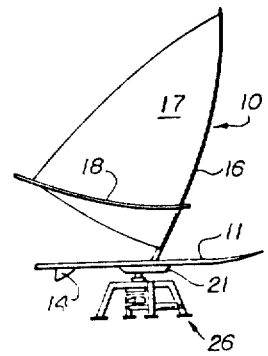
Figure 3:
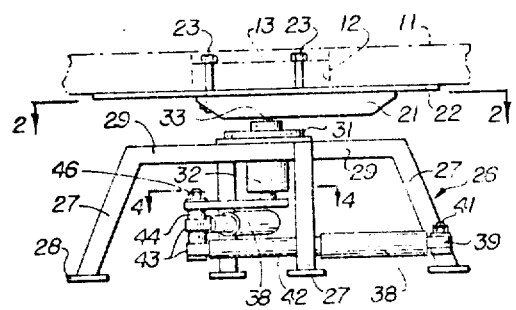
Figure 4:
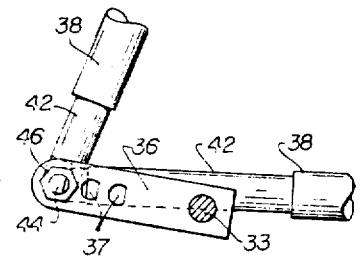

The training device is used to support a board 10, the only modification being that the daggerboard (not shown) has been removed. A table 21 formed of metal and of a shape which is shown in FIG. 2 but is subject to considerable modification is mounted horizontally and is rotatable about an axis as hereinafter described. Preferably, a protector 22 of plywood or other suitable material is interposed between the table 21 and the underside of the hull 11 to protect the latter against damage. Bolts 23 fasten the table 21 to a metal plate 13, which clamps the board 10 to table 21.

Table 21 is supported by a stand 26 which is also subject to a certain amount of modification. As shown, there are four legs 27 on the stand 26, although three legs may be preferred. Each leg 27 has a horizontal pad 28 which rests on the floor or ground and the leg 27 slants upwardly-inwardly and then horizontally inwardly in radial portions 29 which meet in a central hub 31. Within the hub 31 is a vertical bearing 32 which receives vertical shaft 33 which is fixed for rotation with the table 21. Below bearing 32 shaft 33 carries a radial crank 36 formed with a plurality of holes 37 adjacent its outer end, the holes preferably being noncircular.

Two shock absorber bodies 38 are carried by stand 26 and are horizontally disposed preferably 90° apart. The outer end of each body 38 is connected to one of the legs 27 by a bracket 39 fixed to said leg and a bolt 41 which pivotally connects the body 38 to the bracket 39. The shock absorber rod 42 projects from the end of body 38 opposite bracket 39 and carries a collar 43 at its outer end. A vertical pin 44 passes through both the collars 43 of both shock absorbers and is connected to crank 36 through one of the holes 37 and held in place by bolt 46. Adjustment of the dampening effect of the shock absorbers 38 is accomplished by selecting a hole 37 at a different radial distance from the shaft 33.

In use, the hull 11 is connected to the table 21 by means of bolts 23. Preliminarily, a hole 37 for the pin 44 is selected depending upon wind conditions. The user mounts the board and manipulates the booms 18 to accommodate tacking into the wind or running before the wind, depending upon the lesson being learned. The action of the wind on the sail 17 causes the hull 11 to rotate about shaft 33 as it pivots, and this pivotting movement is resisted by the shock absorbers 38 which act on the crank 36. In this respect, the shock absorbers simulate the frictional resistance of the hull 11 through the water and the dampening effect of the skeg 14.

It will be seen that any board 11 may be mounted on the stand 26 so that a user may practice with his or her own board or a board provided by the teacher.

What is claimed is:
1. A windsurfer training device comprising:
 a. a horizontally disposed turntable upon which a windsurfer, with daggerboard removed, can be secured;
 b. a shaft vertically affixed to the turntable and rotatably supporting the turntable on a stand;
 c. a stand having at least three legs and bearings for receiving the shaft, such that the turntable and shaft are rotatably supported by the stand;
 d. a radial crank connected horizontally to the shaft at its lower end, the crank having at least one hole adjacent its outer end;
 e. two shock absorbers, each having one end connected to the outer end of the crank, with the other end being connected to adjacent legs of the stand;
whereby when the windsurfer is secured to the turntable, the action of the wind on the sail is resisted by the shock absorbers so as to simulate water resistance during actual operation of the windsurfer.

2. The windsurfer training device of claim 1 wherein the shock absorbers are horizontally disposed 90° apart.

3. The windsurfer training device of claim 1 wherein the radial crank has three non-circular holes adjacent its outer end.

4. A windsurfing training device comprising a stand to support the device, bearing means having a vertical bore attached to said stand, a vertical shaft oscillatable in said bearing, a table on the upper end of said shaft adapted to support a wind surf board, and drag means mounted on said stand to create a drag on said shaft simulating the drag on a board as it moves in the water, said drag means comprising a crank fixed to said shaft and damping means to damp oscillation of said crank and to dissipate the energy of the force tending to oscillate said shaft.

5. A windsurfing device according to claim 4 which further comprises a plate formed to fit into the top of a well in said board and fastening means passing through said well to attach said plate and said table together.

6. A device according to claim 4 in which said stand comprises a hub receiving said bearing and a plurality of legs extending out from said hub and supporting said hub above the ground.

7. A device according to claim 4 in which said damping means comprises at least one horizontally disposed shock absorber attached at one end to said stand and its opposite end receiving a pin, said pin attached adjacent the outer end of said crank.

8. A device according to claim 7 in which said crank is formed with a plurality of spaced apertures and said pin selectively fits in one of said apertures.

9. A device according to claim 7 in which said damping means comprises a second horizontally disposed shock absorber at an angle to said first-mentioned shock absorber, said second shock absorber also receiving said pin and also being attached to said stand at a point remote from the point of attachment of said first-mentioned shock absorber.

* * * * *

UNITED STATES PATENT OFFICE
CERTIFICATE OF CORRECTION

Page 1 of 2

PATENT NO. : 4,021,934
DATED : May 10, 1977
INVENTOR(S) : GLENN R. TAYLOR

It is certified that error appears in the above-identified patent and that said Letters Patent are hereby corrected as shown below:

Cancel Sheets 1 and 2 of the drawings bearing Patent No. 4,022,034 and insert the drawing as shown on the attached sheet.

Signed and Sealed this

Thirteenth Day of September 1977

[SEAL]

Attest:

RUTH C. MASON
Attesting Officer

LUTRELLE F. PARKER
Acting Commissioner of Patents and Trademark

Patent No. 4,021,934